United States Patent [19]

Ohya et al.

[11] Patent Number: 5,250,126
[45] Date of Patent: Oct. 5, 1993

[54] METHOD FOR MANUFACTURING A RAIL FOR USE IN A LINEAR MOTION ROLLING CONTACT GUIDE UNIT

[75] Inventors: Yasumasa Ohya, Gifu; Koji Kano, Mino, both of Japan

[73] Assignee: Nippon Thompson Co., Ltd., Tokyo, Japan

[21] Appl. No.: 900,042

[22] Filed: Jun. 17, 1992

[30] Foreign Application Priority Data

Jun. 19, 1991 [JP] Japan ................................ 3-174320

[51] Int. Cl.⁵ ................. C21D 1/10; C21D 9/04; F16C 29/02
[52] U.S. Cl. .................... 148/569; 148/581; 148/584; 148/585; 29/898.03; 384/45
[58] Field of Search .............. 148/569, 585, 581, 584; 29/898.03; 384/45

[56] References Cited

U.S. PATENT DOCUMENTS 3,813,760 6/1974 Arndt .................................. 29/402.18
4,635,331 1/1987 Walter et al. ...................... 29/898.03

FOREIGN PATENT DOCUMENTS 2-266112 10/1990 Japan .

Primary Examiner—R. Dean
Assistant Examiner—Sikyin Ip
Attorney, Agent, or Firm—Skjerven, Morrill, MacPherson, Franklin & Friel

[57] ABSTRACT

A method for manufacturing a rail for use in a linear motion rolling contact guide unit is provided. A rail intermediate product having a top surface, a pair of side surfaces, each formed with a guide groove portion, and a bottom surface is provided by drawing from an alloy steel material. Then the guide groove portion is hardened by induction hardening. The side surface is then ground by a profiled grinder having a grinding shape complementary to the shape of a side surface of a finished rail.

4 Claims, 6 Drawing Sheets

METHOD FOR MANUFACTURING A RAIL FOR USE IN A LINEAR MOTION ROLLING CONTACT GUIDE UNIT

BACKGROUND OF THE INVENTION

1. Field of the Invention

This invention generally relates to a method for manufacturing a rail for use in a linear motion rolling contact guide unit, and, in particular, to a method for manufacturing such a rail at extremely high accuracy and precision.

2. Description of the Prior Art

A linear motion guide unit is well known in the art, and it generally includes a rail, a slider and a plurality of rolling members interposed between the rail and the slider for providing a rolling contact between the rail and the slider. There are basically two types of such a linear motion guide unit, i.e., the infinite stroke type and the finite stroke type. Such a typical prior art linear motion guide unit is illustrated in FIG. 7. As shown, the illustrated linear motion guide unit includes a rail 1 extending straight over a desired length, a slider 3 slidably mounted on the rail 1 in a straddling manner, and a plurality of balls 2 as rolling members interposed between the rail 1 and the slider 3. Use may also be made of rollers as rolling members in place of balls 2.

In the structure shown in FIG. 7, the rail 1 is elongated in shape and has a generally square or rectangular cross section so that it has a pair of opposite side surfaces 4, each of which is formed with an inner guide groove 5 extending in parallel with the longitudinal axis of the rail 1. Thus, the structure shown in FIG. 7 provides a two guide channel type linear motion guide unit. Alternatively, as shown in FIG. 8, another inner guide groove 7 may be formed in each of the opposite side surfaces, or at the top thereof, of the rail 1, in which case a four guide channel type linear motion guide unit is provided.

As shown in FIG. 7, the rail 1 is provided with a plurality of mounting holes 19 through which bolts or the like may be inserted to have the rail 1 fixedly mounted on a desired object. On the other hand, the slider 3 typically has a U-shaped cross section, including a horizontal section and a pair of side sections depending from the opposite sides of the horizontal section, so that the slider 3 is slidably mounted on the rail 1 in a straddling manner. The slider 3 is typically provided with a pair of endless circulating paths, including a load path section 6, a return path section and a pair of curved connecting path sections connecting the corresponding ends of the load and return path sections as well known in the art. An outer guide groove is formed in a surface of each of the side sections of the slider in an opposed relationship with a corresponding one of the inner guide grooves 5 of the rail to thereby define a load path section 6 as a guide channel between the associated pair of inner and outer guide grooves.

A plurality of rolling members or balls 2 in the illustrated example are provided in each of the endless circulating paths so that the balls 2 in the load path sections 6 provide a rolling contact between the rail 1 and the slider 3 and therefore the slider 3 may move relative to the rail 1 as long as the rail 1 extends.

When the slider 3 is detached from the rail 1 for some reason, such as maintenance or repair, mostly those balls 2 which are located in the load path sections 6 fall off. If this happens, it would be extremely difficult to put all of the balls 2 back in position when the slider 3 is mounted on the rail 1 once again. Thus, in order to prevent the balls 2 from falling off when the slider 3 is removed from the rail 1, a ball retaining member 8 extending generally along the load path section 6 is provided with its both ends fixedly attached to the slider 3 so as to prevent the balls 2 from falling off when the slider 3 is detached from the rail 1.

Such a ball retaining member 8 is integral with and thus moves with the slider 3 and thus it must be located not to scrub against the rail 1 when the slider 3 moves relative to the rail 1. For this reason, a relief trench 9 is provided at the bottom of each of the inner guide grooves 5 extending in parallel with the longitudinal axis of the rail 1 to receive therein a portion of the ball retaining member 8 without contact. In the prior art, such a relief trench 9 is typically either square or rectangular in shape. Incidentally, in the structure shown in FIG. 8, the additional guide groove 7 is not provided with a relief trench; however, as well known in the art, a plate-shaped projection is typically provided on the slider 3 to project therefrom toward the balls 2 to retain the balls 2 in position, though such a projection is not shown specifically.

Now, a typical prior art method for manufacturing the rail 1 will be described with reference to FIGS. 4 through 6.

(a) As shown in FIG. 4, a rail intermediate product 10 having a shape indicated by the two-dotted line is formed from an alloy steel material or the like by drawing.

(b) After drawing, a relief trench 9 for receiving therein a corresponding ball retaining member 8 is formed at the bottom of each of inner guide grooves 11 by milling as shown in FIG. 5.

(c) Then, a guide surface 12 of the inner guide groove 11 is hardened by induction hardening.

(d) Then, after removing distortions due to heat treatment, selected portions of the rail intermediate product 10, including a top surface portion 13, a guide groove portion 11, a guide surface portion 12, a side surface portion 14 and a bottom surface portion 15, as indicated by the fat lines in FIG. 6, are ground to thereby finish the top surface 16, rail guide groove 5, side surface 17, and bottom surface 18 to a desired shape and accuracy, as shown by the solid line in FIG. 4.

Additional steps, such as a step for providing the mounting hole 19, are also carried out, but such additional steps are omitted since they do not form a part of the present invention. In FIG. 4, a contact relationship between the finished guide groove 5 and an associated ball 2 is illustrated. It is to be noted that a side recess 20 remains unprocessed after drawing as indicated by the dotted line in FIG. 6.

In accordance with the prior art, the relief trench 9 is formed by milling irrespective of the length of the rail 1 to be manufactured. Thus, if the rail 1 is relatively long, there may be produced a larger deformation after heat treatment so that there arise fluctuations in the position of the relief trench 9. Thus, after grinding, when the rail 1 and the slider 3 are assembled, there arises a case in which the ball retaining member 8 is in contact with the relief trench 9 of the rail 1. In order to avoid such an inconvenience, the width of the relief trench 9 must be made significantly larger as compared with the size of the ball retaining member 8. It is disadvantageous to set the width of the relief trench 9 larger since the effective ball bearing portion of the guide groove 5 is reduced and the rigidity of the guide groove 5 is also reduced.

As shown in FIG. 7, an end seal block 21 is provided at each end of the slider 3, and the end seal block 21 has a sliding end 22 which is in sliding contact with the top surface 16 and side surface 4 of the rail 1 so that a sealing characteristic between the rail 1 and the slider 3 during a relative motion between the rail 1 and the slider 3 is maintained at a predetermined level to thereby prevent any undesired foreign material from entering into the gap between the rail 1 and the slider 3. However, if there are significant fluctuations in the position of relief trench 9, the sealing characteristic of the end seal 21 may be impaired so that undesired foreign material may be allowed to enter in the gap between the rail 1 and the slider 3, which is particularly undesirable.

In addition, since the processing of the relief trench 9 and the processing of the guide groove 5 are carried out separately and before and after heat treatment in the prior art process, an absolute shift in position between the relief trench 9 and the guide groove 5 tends to be amplified, which can also be a cause of a sliding contact between the ball retaining member 8 and the relief trench 9. Furthermore, since the side recess 20 of the rail 1 remains unprocessed after drawing, a bottom surface seal 24 of the slider 3 cannot be brought into sliding contact with the side recess 20, and, thus, the sealing characteristic between the rail 1 and the slider 3 remains incomplete in this respect also.

SUMMARY OF THE INVENTION

In accordance with the present invention, there is provided a method for manufacturing a rail for use in a linear motion rolling contact guide unit, including steps of:

providing a rail intermediate product having a top surface, a pair of side surfaces and a bottom surface by drawing a metal material, whereby at least said side surface is formed with a guide groove portion extending in parallel with a longitudinal axis of said rail intermediate product; hardening said guide groove portion; and grinding at least said side surface in its entirety using a profiled grinder having a shape of a side surface of said rail.

In the preferred embodiment, the profiled grinder includes a projection defining a relief trench at the bottom of a guide groove. Preferably, the projection has a particular shape such that a tapered relief trench is formed after grinding. The hardening step is preferably carried out by induction hardening.

In this manner, in accordance with the present invention, since the entire side surface of a rail is finished at the same time using a profiled grinder, the process steps are minimized and the process can be carried out efficiently. Besides, because of the use of a profiled grinder, the shape of the side surface of a rail can be defined at high accuracy and without errors. Therefore, this is particularly advantageous in forming a trench relief at the bottom of a guide groove since no positional errors will be produced between the trench relief and the guide groove. As a result, the size of a relief trench can be minimized since it is not necessary to provide any clearance between the relief trench and the guide groove. This is also advantageous since it allows to provide a maximum bearing surface for the rolling members such as balls.

It is therefore a primary object of the present invention to provide an improved method for manufacturing a rail for use in a linear motion rolling contact guide unit.

Another object of the present invention is to provide an improved method for manufacturing a rail for use in a linear motion rolling contact guide unit at high accuracy and efficiency.

Other objects, advantages and novel features of the present invention will become apparent from the following detailed description of the invention when considered in conjunction with the accompanying drawings.

DESCRIPTION OF THE PREFERRED EMBODIMENTS

Figure 7:
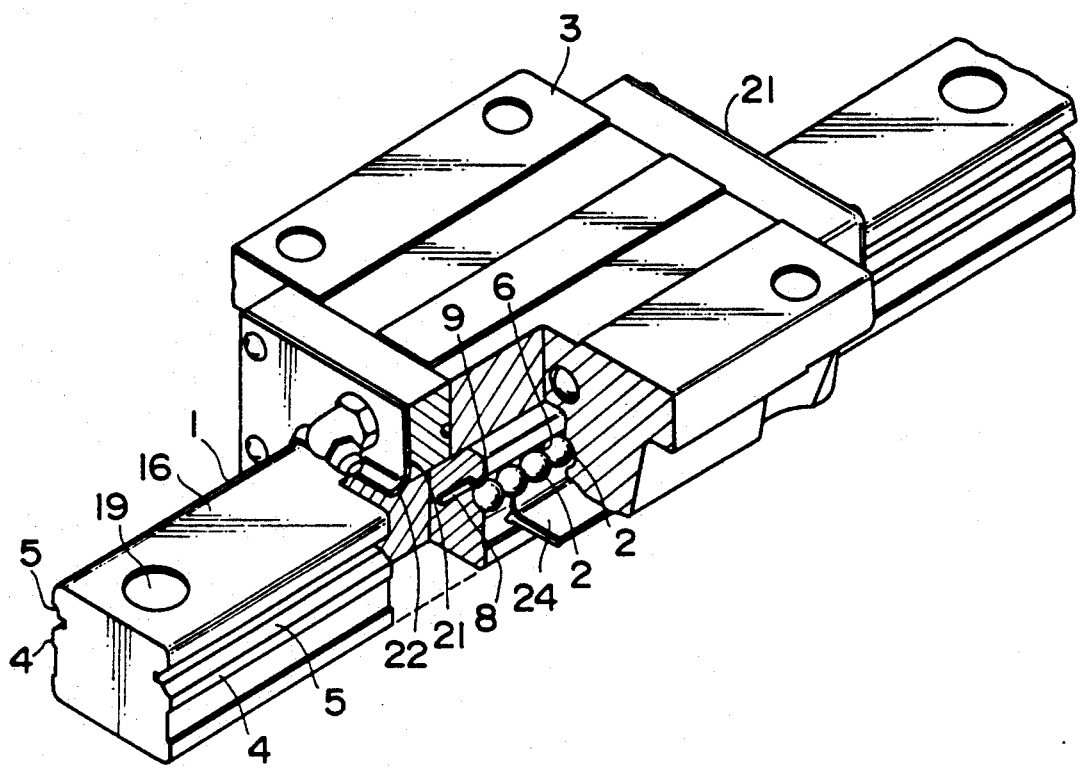
FIG. 7 is a schematic illustration showing in perspective view with parts removed a typical infinite type linear motion rolling contact guide unit having two guide channels.
Figure 8:
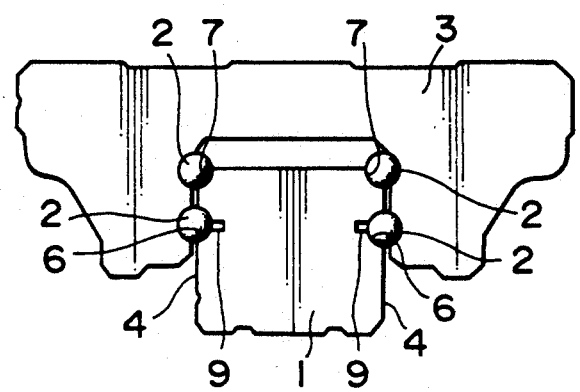
FIG. 8 is a schematic illustration showing in transverse cross section another typical infinite type linear motion rolling contact guide unit having four guide channels.

The present invention provides a method for manufacturing a rail for use in a linear motion rolling contact guide unit as shown in FIG. 7. As shown in FIG. 7, the linear motion rolling contact guide unit generally includes a rail 1, a slider 3 and a plurality of rolling members or balls 2 in the illustrated example. The rail 1 is elongated in shape and it may have any desired length. Typically, the rail 1 has a substantially flat top surface 16, a substantially flat bottom surface and a pair of side surfaces 4. The side surface 4 is formed with a guide groove 5 extending in parallel with the longitudinal axis of the rail 1 so that the side surface 4 is profiled in a particular shape to provide ups and downs and not substantially flat. In the illustrated example, the guide groove or inner guide groove 5, together with an associated outer guide groove formed in the slider 3 in an opposed relationship, defines a load path section 6 of an endless circulating path. In addition, a relief trench 9 is formed at the bottom of the guide groove 5 extending in parallel with the longitudinal axis of the rail 1 for receiving therein a part of a ball retaining member 8 fixedly attached to the slider 3. In this manner, because of the provision of the guide groove 5 and the relief trench 9, the side surface 4 of the rail 1 is irregular and profiled in particular shape.

Figure 1:
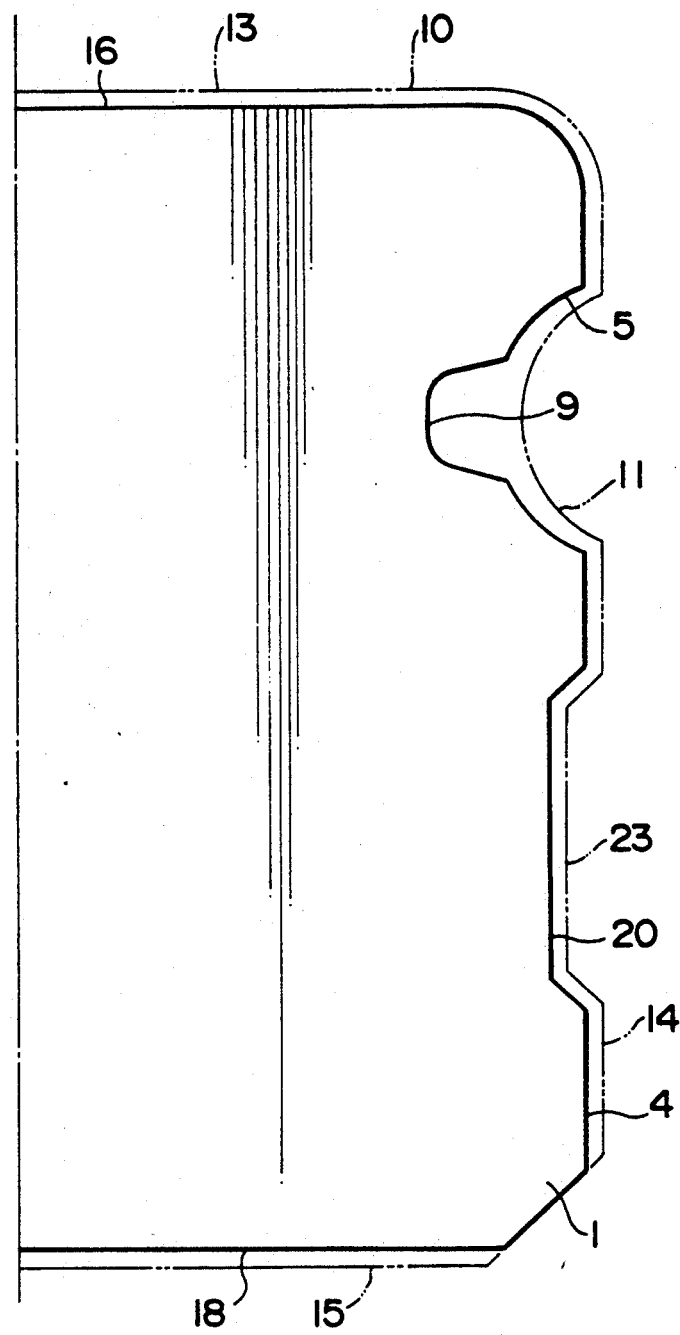
FIG. 1 is a schematic illustration showing a right-hand half of a rail before and after grinding by a profiled grinder in accordance with one embodiment of the present invention.

In accordance with a preferred embodiment of the present invention, as a first step, a rail intermediate product 10 having a top flat surface 13, a bottom flat surface 15 and a profiled from a desired metal material, such as an alloy steel material. As shown in FIG. 1, the profiled side surface 14 includes a guide groove portion 11 and a side recess portion 23 in the illustrated embodiment. It is to be noted, however, that any additional irregular portions may be provide in the profiled side surface 14 without departing from the spirit and scope of the present invention. It should also be noted that the top and bottom surfaces 13 and 15 may also be profiled in any desired shapes, though these surfaces are flat in the illustrated embodiment.

Then, at least the guide groove portion 11 of the rail intermediate product 10 thus drawn in subjected to a hardening step to harden a selected portion, or the guide groove portion 11 in the illustrated embodiment, of the rail intermediate product 10. Any hardening method may be applied for this purpose, but one preferred method is an induction hardening method.

Figure 2:
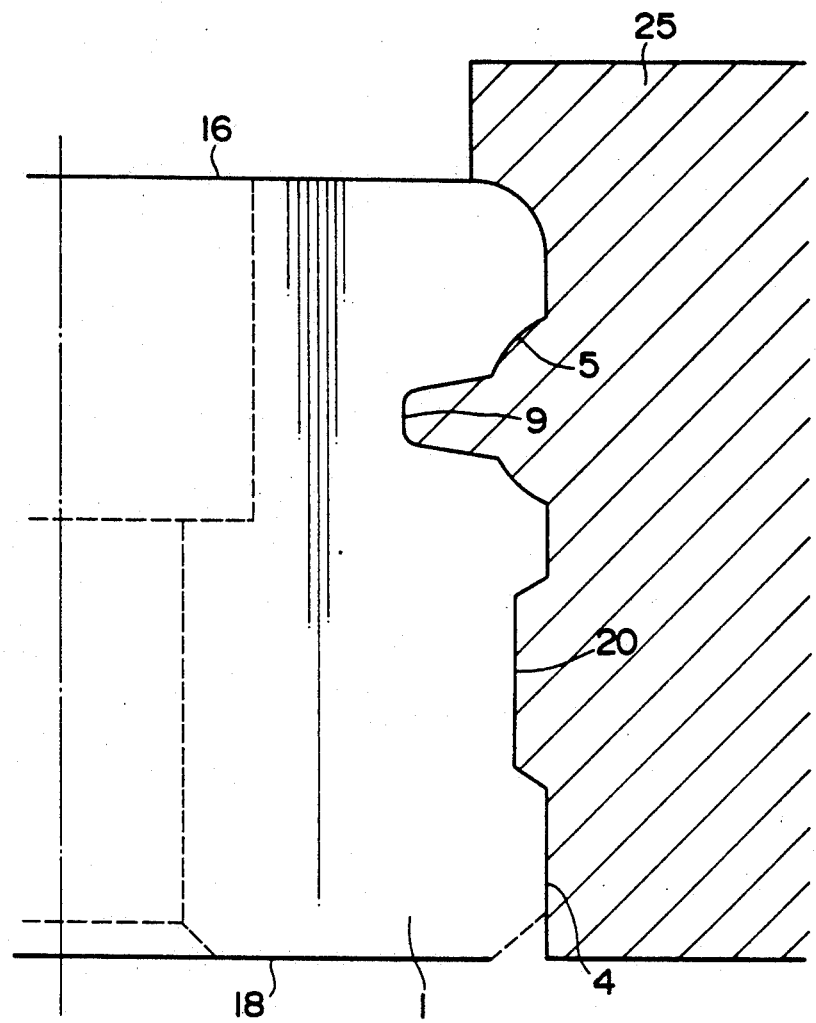
FIG. 2 is a schematic illustration showing a step of grinding the side surface of a rail intermediate product using a profiled grinder in accordance with one embodiment of the present invention.

Then, the entire side surface 14 is subjected to grinding at the same time using a profiled grinder 25 as shown in FIG. 2. The profiled grinder 25 has a grinding surface the shape of which is complementary to the shape of a side surface of a finished rail 1. Thus, the grinding surface of the profiled grinder 25 includes a portion defining the guide groove 5 of the rail 1, a portion defining the relief trench 9 of the rail 1, and a portion defining the side recess 20 of the rail 1. As a result, when the side surface 14 of the rail intermediate product 10 is subjected to grinding using the profiled grinder 25 as shown in FIG. 2, the side surface 4 of the rail 1 is processed to a finished, final shape all at once.

In the illustrated embodiment, the top and bottom flat surfaces 13 and 15 of the rail intermediate product 10 are subjected to grinding using any conventional grinder to define top and bottom flat surfaces 16 and 18 of the rail 1, respectively, as shown in FIG. 2. In this manner, there is obtained a rail 1 having top, bottom and side surfaces finished to a desired shape, which is ready for use in assembling into a linear motion rolling contact guide unit. In accordance with the above-described method, almost all surfaces of the rail 1 have been ground. Thus, when assembled into a linear motion rolling contact guide unit as shown in FIG. 7, the sealing end 22 of the end seal 21 fixedly attached to each end of the slider 3 and the bottom seal 24 fixedly attached to the bottom of the slider 3 can be brought into a proper sliding contact with the respective surfaces of the rail 1, which, in turn, allows to obtain a proper sealing characteristic to prevent any undesired foreign matter from entering into a gap between the rail 1 and the slider 3.

Figure 3:
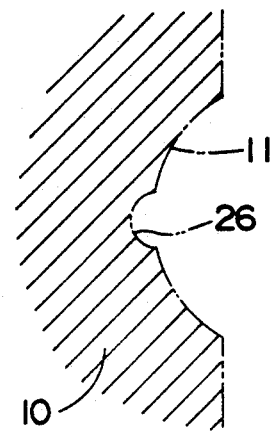
FIG. 3 is a schematic illustration showing a part of a rail intermediate product after drawing in accordance with another embodiment of the present invention.
Figure 4:
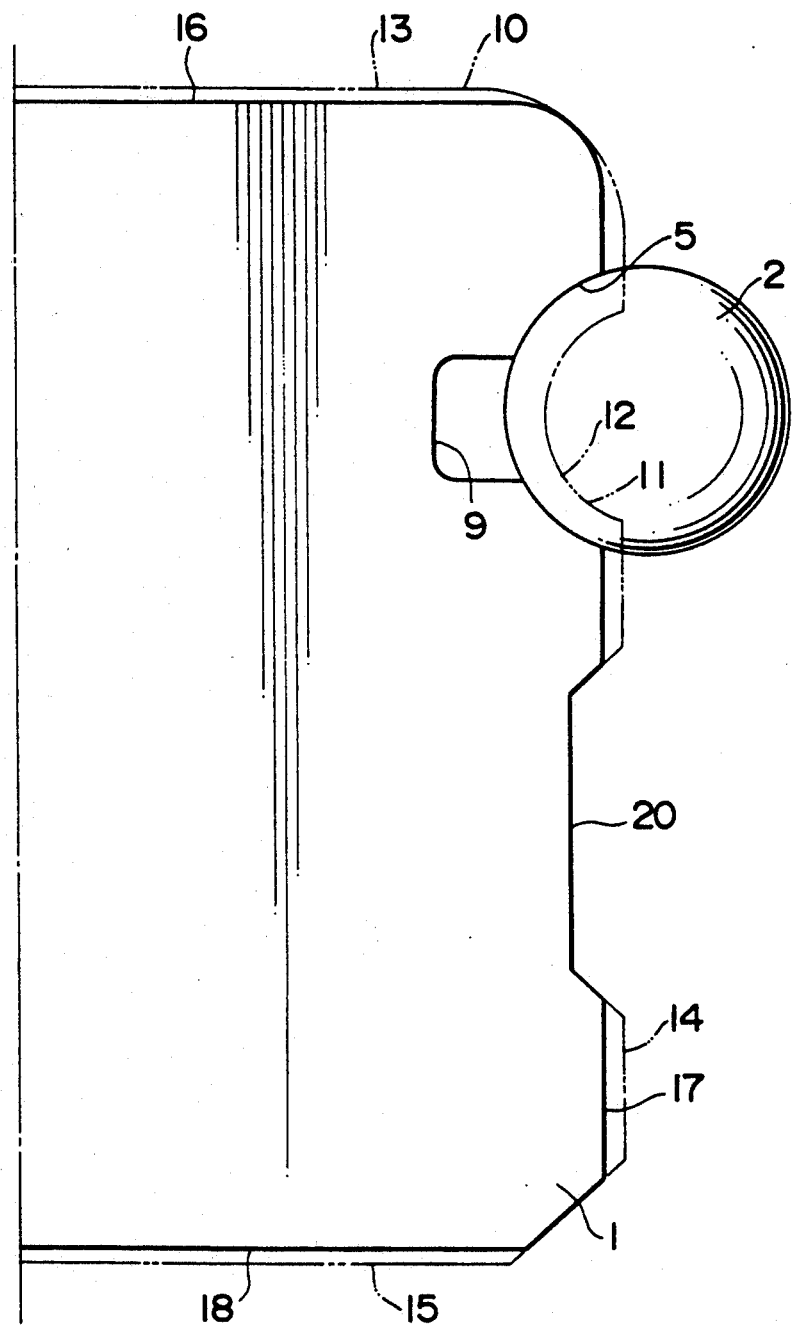
FIG. 4 is a schematic illustration showing a right-hand half of a rail before and after grinding in accordance with a typical prior art method.
Figure 5:
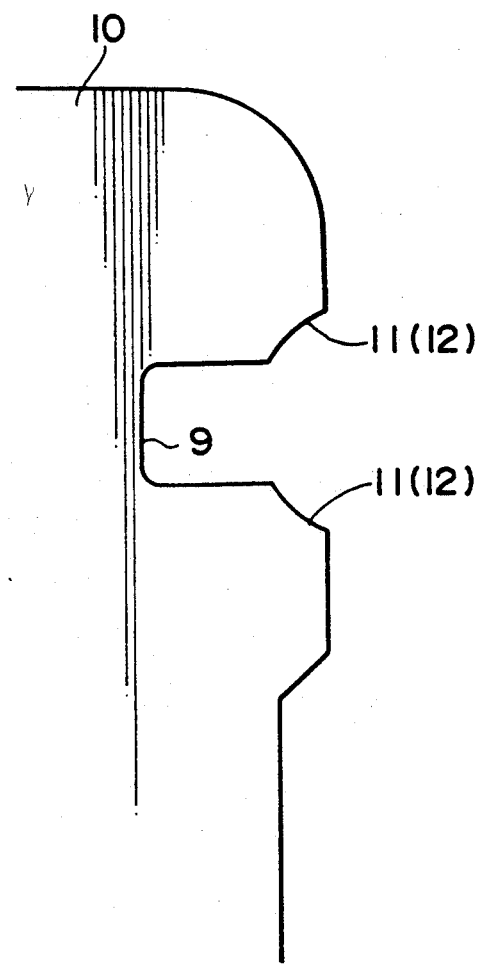
FIG. 5 is a schematic illustration showing on an enlarged scale the structure of a guide groove and a relief trench formed at the bottom of the guide groove in accordance with prior art method.
Figure 6:
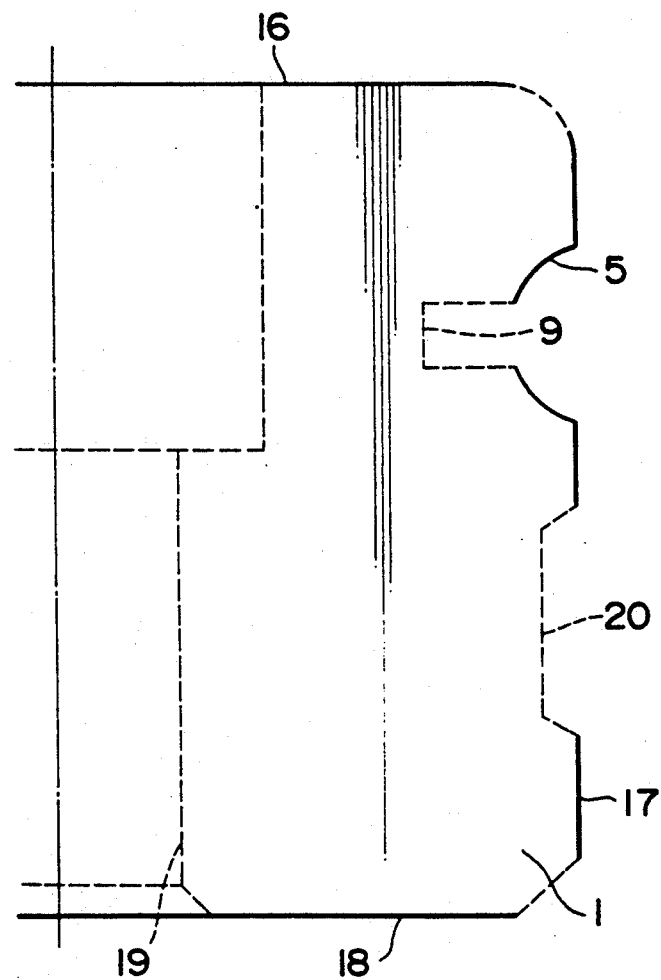
FIG. 6 is a schematic illustration useful for explaining how selected portions of a surface of rail are finished in accordance with the prior art method.

As a modification to the above-described preferred embodiment, a step of removing distortions due to heat treatment is preferably carried out before the grinding step using a profiled grinder. As another modification, as shown in FIG. 3, a relief trench portion 26 is provided at the bottom of the guide groove portion 11 in the side surface of the rail intermediate product 10 when provided by drawing. The provision of such relief trench portion 26 contributes to ease and shorten the grinding step using the profiled grinder 25. Besides, the clearance set for grinding the relief trench 9 may also be minimized by the provision of such relief trench portion 26. It is also preferable to define the relief trench 9 which is generally in the shape of "U" and tapered. That is, if the relief trench 9 is so shaped that its width become gradually smaller toward its tip end, the relief trench 9 can be ground more easily and efficiently. In the illustrated embodiment, the relief trench 9 has a taper at an angle of 15 degrees. Although this angle is preferred, any other angle may also be used without departing from the spirit and scope of the present invention. With such a tapered relief trench 9, a seal lip of the end seal 21 may be easily and securely inserted into the relief trench 9 when assembling a linear motion guide unit.

As described above, in accordance with the present invention, there is no need to carry out a milling step for forming a relief trench, and, thus, the method can be carried out more efficiently and reliably. Since the relief trench and the guide groove are formed at the same time using a profiled grinder, no positional errors between these two elements are produced, so that the guide groove and the relief trench can be formed at high accuracy and precision. In addition, the relief trench can be minimized in size, which contributes to provide an increased ball bearing surface and thus high performance and rigidity.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for manufacturing a rail for use in a linear motion rolling contact guide unit, comprising the steps of:
   providing a rail intermediate product having a top surface, a pair of side surfaces and a bottom surface by drawing a metal material, such that each of said side surfaces is formed with a guide groove portion extending in parallel with a longitudinal axis of said rail intermediate product;
   first hardening said guide groove portion; and
   then grinding each of said side surfaces in its entirety using a profiled grinder having a grinding shape complementary to a shape of a finished side surface of said rail, which includes a tapered relief trench at a bottom thereof.

2. The method of claim 1, wherein said side surface of said rail also includes a side recess separated away from said guide groove.

3. The method of claim 1, wherein each of said side surfaces of said rail intermediate product is formed with a relief trench portion when drawn.

4. The method of claim 1, wherein said hardening step is carried out by an induction hardening process.

* * * * *